Figure 1:
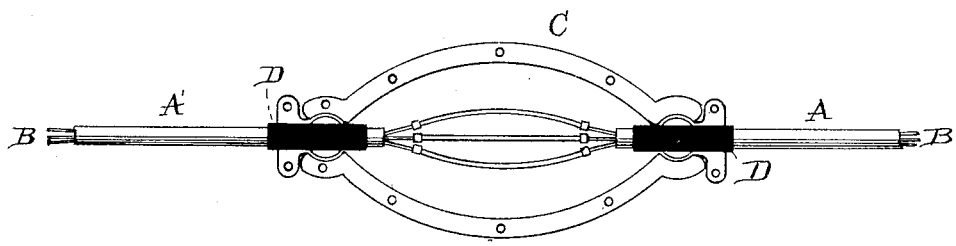

(No Model.)

P. SEUBEL.
ELECTRIC CONDUCTOR.

No. 425,961. Patented Apr. 15, 1890.

WITNESSES:

INVENTOR
Philip Seubel
BY
ATTORNEYS.

UNITED STATES PATENT OFFICE.

PHILIP SEUBEL, OF NEW YORK, ASSIGNOR TO THE EDISON MACHINE WORKS, OF SCHENECTADY, NEW YORK.

ELECTRIC CONDUCTOR.

SPECIFICATION forming part of Letters Patent No. 425,961, dated April 15, 1890.

Application filed January 16, 1889. Serial No. 296,527. (No model.)

*To all whom it may concern:*

Be it known that I, PHILIP SEUBEL, a citizen of the United States, residing at New York city, in the county and State of New York, have invented a certain new and useful Improvement in Electrical Conductors, of which the following is a specification.

My invention relates mainly to the conductors of systems of electrical distribution which are placed under ground and provided with metallic coverings—such as iron tubes—for protecting them from moisture or from mechanical injury. The invention is, however, adapted for use with any electrical conductors which have protecting coverings of metal. If in an underground electrical circuit the insulation between the conductors and the metal tube becomes impaired, the result is a ground-connection from the conductors, and if the metal covering is continuous, as it has heretofore been made, this ground-connection is communicated to the whole system through such metal covering.

The object of my invention is to avoid this difficulty, or at least to reduce it to a minimum, and I accomplish this by dividing the metal covering into sections insulated from each other by suitable insulating material interpolated at convenient distances apart. By this means, if the ground-connection occurs on one section, it will not be communicated through the metal covering to the rest of the system. While there may be a certain amount of leak between two sections through the earth which surrounds them, such a leak will be one of high resistance, so that the amount of current which will flow through it will not practically affect the working of the system. I prefer that the insulating devices shall be impervious to moisture.

A further advantage of the use of my invention is that the operation of locating or determining the situation of a ground-connection in the usual manner by means of induction apparatus is greatly facilitated. When the metal covering is continuous, as heretofore, the current of a ground leak will return to the source over the metal covering, so that the induction which is depended upon to locate the defect is neutralized. In many cases it is on this account impossible to employ the induction method of locating faults; but where the metal covering is interrupted by insulating material inserted at intervals the current of the ground leak is forced to return by a different way—that is, through the earth—and it may therefore be readily detected by the induction apparatus. I may insert the insulating material at the coupling-boxes of the system by insulating the tubes from the boxes, or I may connect tubes together at intervals by insulating-sleeves, or the isolation of sections of the metal covering from each other may be accomplished in any other suitable and convenient manner.

My invention is illustrated in the accompanying drawings.

Figure 2:
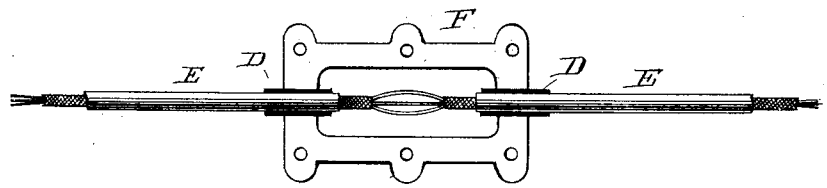
Figure 3:

Figure 1 illustrates the connection of two iron covering-tubes through a coupling-box, the tubes being insulated from the box. Fig. 2 illustrates a lead-covered cable connected and insulated in a similar manner, the insulating-sleeves being shown in section; and Fig. 3 illustrates the use of insulating-sleeves.

Referring, first, to Fig. 1, A and A' are iron tubes, within which are placed conductors B, insulated from each other and from the tubes.

C is an ordinary coupling device, within which connections are made between the conductors B, such coupling-box being entered by the tubes and the tubes being connected with the coupling-box by ball-and-socket joints. At each point where the tube enters the box such tube is surrounded by a sleeve D, of suitable insulating material. The sleeve D may be made of hard rubber or of wood, which may be impregnated with moisture-proof compounds, or they may be wrappings of insulating-tape or other suitable material.

In Fig. 2 E and E' represent lead-covered cables joined by a coupling-box F and insulated from the box at the tube-openings by sleeves D, such as above described.

Fig. 3 shows another lead-covered cable with the lead covering broken at intervals and united at these points by sleeves D, such as above described.

It will be seen that in each of these cases the metal coverings of the conductors are divided into sections insulated from each other, whereby ground-connections on one section are not communicated to the others.

It will also be seen that my invention is adapted for use with metal-covered conductors of any character.

What I claim is—

1. The combination, with an electrical conductor inclosed in metal coverings, of metal coupling-boxes within which the conductors are connected, and insulating material between the metal covering and the coupling-box, forming a water-tight joint and breaking the electrical continuity of the covering, and insulating-joints between the boxes, substantially as set forth.

2. The combination, with an electrical conductor, of a metal covering therefor divided throughout its length between the terminal or junction boxes into a number of sections, and insulating-joints for the metal covering at the points of divisions, substantially as set forth.

This specification signed and witnessed this 22d day of October, 1888.

PHILIP SEUBEL.

Witnesses:
WILLIAM PELZER,
A. W. KIDDLE.